of the page:

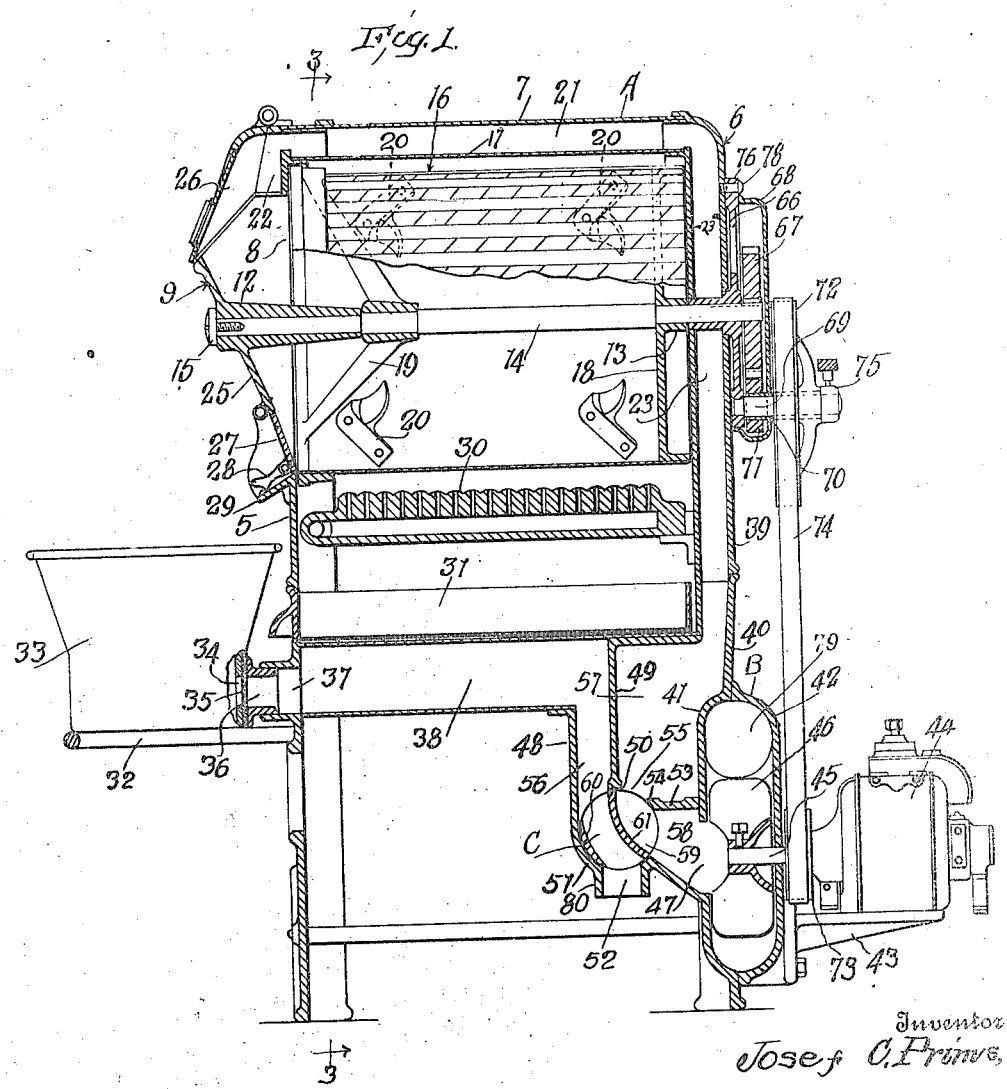

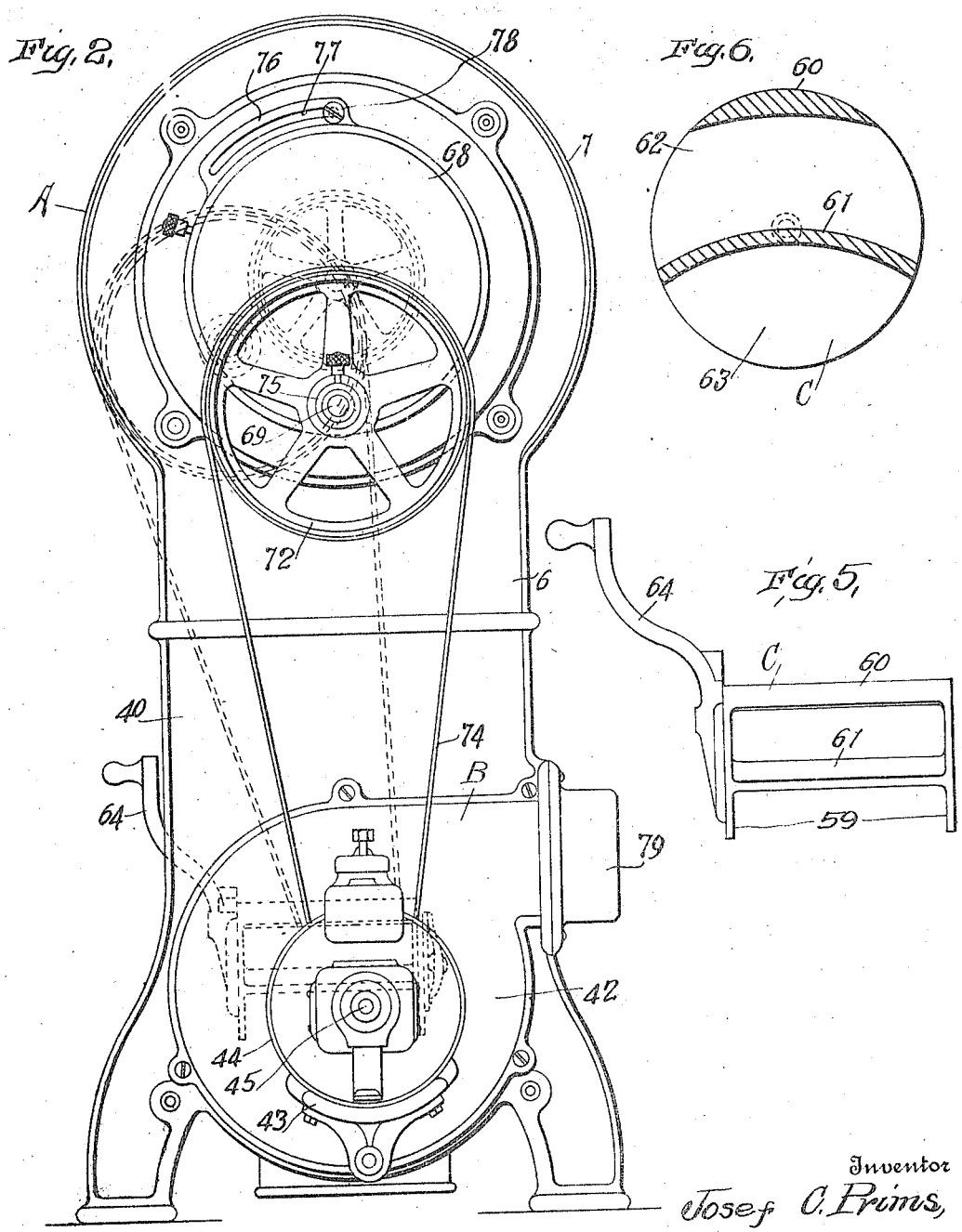

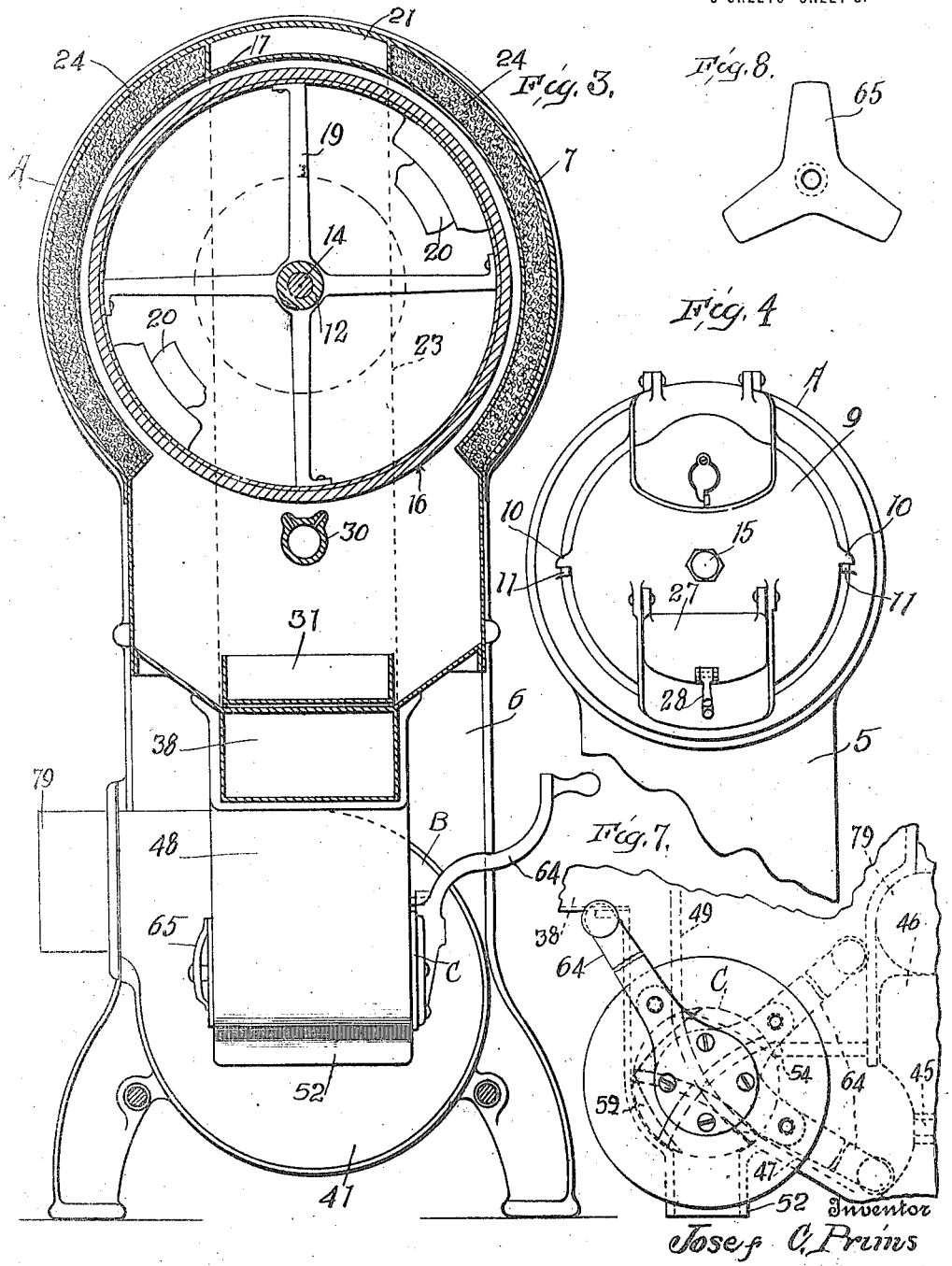

UNITED STATES PATENT OFFICE.

JOSEF C. PRIMS, OF HORNELL, NEW YORK, ASSIGNOR TO THE A. J. DEER CO., INC., OF HORNELL, NEW YORK, A CORPORATION OF NEW YORK.

COFFEE-ROASTER.

1,160,650.

Specification of Letters Patent. Patented Nov. 16, 1915.

Application filed February 3, 1913. Serial No. 745,991.

*To all whom it may concern:*

Be it known that I, JOSEF C. PRIMS, a citizen of the United States, residing at Hornell, in the county of Steuben and State of New York, have invented certain new and useful Improvements in Coffee-Roasters, of which the following is a specification, reference being had therein to the accompanying drawings.

This invention relates to new and useful improvements in coffee roasters and has for its object to provide improved means for directing currents of air through the various devices in which the coffee is subjected to treatment, and for controlling those currents of air to cause them to act upon any one of several such devices.

A further object of the invention is to provide a rotary coffee container, a fan and a driving connection therebetween, the connection including a novel means for quickly adjusting the tension of the driving device.

In the accompanying drawings, Figure 1 is a vertical, sectional view taken through a coffee roaster showing one embodiment of my invention; Fig. 2 is a rear elevation of such a coffee roaster; Fig. 3 is a cross sectional view taken on the line 3—3 of Fig. 1; Fig. 4 is a front elevation of the upper portion of the roaster; Fig. 5 is a side elevation of the rotary valve member; Fig. 6 is an enlarged cross sectional view of the valve; Fig. 7 is a detail side elevation showing the valve operating handle; and Fig. 8 is a detail view of the spring washer employed in connection with the valve.

In these drawings there is shown a casing A which includes front and rear walls 5 and 6 and a cylinder 7 which connects the upper portions of said walls. The upper portion of the front wall 5 is formed with a circular opening 8, and this opening is concentric with the axis of the cylinder 7. The opening 8 is closed by a detachable head 9, said head being formed at diametrically opposite points with supporting lugs 10—10, said lugs resting upon projections 11—11 carried by the front wall 5. Extending inwardly from the head 9 and arranged concentrically with the cylinder 7 is a bearing 12, and extending inwardly from the rear end of the wall 6 and disposed in alinement with said bearing 12 is a bearing 13. A shaft 14 has its ends respectively journaled in said bearings, the front end of the shaft carrying a set screw 15 which engages the front edge of the bearing 12 to limit the outward movement of the head 9. The rear end of the shaft 14 extends beyond the rear wall 6 for a purpose which will hereinafter be explained.

The coffee container is mounted upon the shaft 14 and, in the present instance, this container is shown as a cylindrical shell 16 which is rigidly mounted on the shaft and has its front end open and its rear end closed by a head 18 which is mounted on the shaft 14 and serves to support that end of the container. The front end of the container is supported on the shaft 14 by means of arms 19, but it will be understood that this connection may be formed in any suitable manner. The cylindrical container is provided on its inner periphery with a plurality of agitators 20 which are spaced apart about the wall thereof. The cylindrical container 16 is somewhat smaller in diameter than the cylindrical portion 7 of the casing and is arranged substantially concentric with that portion of the casing 7. A part of the space between the casing 7 and the container is utilized to contain a packing or a filling of insulating material, and a portion of the space is utilized to form a conduit. To accomplish this the casing is provided with an inner cylindrical portion 17 spaced away from the outer portion of the casing and of a diameter slightly greater than the diameter of the cylindrical container. The space between the casings 7 and 17 is divided by longitudinal partitions into three compartments, the two side compartments containing a filling of insulating material, as shown at 24, and the third compartment, which lies between the other compartments and above the cylinder, forming a conduit 21 which communicates at 22 with the front end of the cylindrical container and extends for the full length of the container and communicates at its rear end with a vertical conduit 23 formed between the rear wall of the main casing and an inner wall 23ª, which inner wall forms the end wall of the inner cylindrical casing 17.

The head 9 is centrally bulged outwardly, as indicated at 25, and formed in the upper portion of this head above the bearing 12 is an opening which is normally closed by a gravity door 26, this door, when opened, serving to permit of coffee being inserted within the container 16. Formed in the head 9 below the bearing 12 is a suitable exit opening, and this opening is closed by a swinging door 27. The door 27 is normally held closed by a gravity latch 28 but when this latch is released the door will, by gravity, partially swing open and permit the coffee to pass outwardly and into the chute 29.

Suitably supported within the casing below the container 16 is a heater 30, of any suitable type, although in this instance I have shown a gas burner. Disposed below the burner is a removable tray 31.

Extending forwardly from the front wall 5 below the tray 31 is a bracket 32 and detachably supported upon this bracket is a coffee receptacle 33, said receptacle being disposed below the chute 29 so as to receive the coffee therefrom. The rear wall of this receptacle is formed with an opening 34 and this opening is covered by a screen 35. Extending rearwardly from the receptacle and around said opening is a nipple 36 which fits within a nipple 37 formed on the front end of a rearwardly extending air conduit 38.

The rear wall 6 of the casing A, which may, if desired be formed in two parts, as indicated at 39 and 40, has its lower portion shaped to form one side of a fan casing, as indicated at 41. The other side, 42, of said casing is detachably connected to the lower section 40 of said rear wall. Detachably mounted upon the side 42 of said fan casing is a bracket 43 which supports a motor 44 of any suitable type, such, for instance, as an electric motor. This motor includes an armature or drive shaft 45 which extends forwardly into the fan casing B through a suitable opening formed in the side 42 of said casing.

Fixed on the shaft 45 is a suitable fan which, in the present instance, is a suction fan 46, and is arranged within the fan casing, the latter being provided concentrically with the fan with an air inlet opening, as shown at 47, and also with an outlet opening 79. Means are provided for connecting this fan with any one of the plurality of devices in which the coffee is subjected to treatment. The roaster is here shown as embodying two of these devices, one the container 16 and the other the cooling receptacle 33. Other devices, such, for example, as a stoner or cleaning device, are frequently employed with the coffee roaster and are mounted adjacent thereto but inasmuch as such a device is of a well known construction I have not illustrated the device itself but have merely shown means for connecting the fan with such a device. To connect these devices with the fan a series of conduits are provided leading from the respective devices to the inlet opening or conduit 47 of the fan casing. One of these conduits, which is indicated at 57, forms an extension of the conduit 23 which is connected with the coffee container 16, and this extension is formed by the back wall 40 and an extension 49 of the partition or wall 23ª. The lower part of the conduit is partially closed, sufficient space being left between the end 54 of the partition 53 and the end 50 of the wall 49 to form a port leading from the conduit 57 to a valve chamber 51 in which is mounted a rotatable valve member C. The conduit 38 leading from the cooling receptacle 33 has an extension or continuation, as indicated at 56, which also communicates with the valve chamber 51, and, in the present instance, this extension 56 is formed between the wall 49 and the partition or wall 48, the lower portion of which is shaped to form one of the walls of the valve chamber and is connected with the wall 41 of the fan casing. The lower portion of this wall 48 has an inlet opening 52, communicating with the valve chamber 51 and having its walls extended to form a nipple 80, by means of which it may be connected with a stoner or other such device through which it may be desired to pass a current of air. The ends of the walls forming the several conduits are preferably curved to form portions of the walls of the valve chamber, such walls constituting a seat for the valve member C. This valve member is of such a character that it can be turned into a position to connect any one of the three conduits leading to the chamber with the fan casing and to disconnect the other two conduits therefrom. To this end the valve is of the special construction shown in Fig. 6 and comprises in addition to its end walls or heads 59 two transverse walls 60 and 61 which are spaced apart and curved to form valve ports. The space between the partitions 60 and 61 comprises the port 62 and the space on the outside of the wall 61 forms the port 63. The relative size, position and shape of these ports is such that the two ports may be so positioned that any one of the three conduits will be connected with the fan casing.

With the valve in the position shown in Fig. 1 the port 63 will connect the conduit 57—23 with the fan casing and the operation of the fan will draw a current of air through the coffee in the container 16. By imparting substantially a half revolution to the valve the wall 60 will be caused to extend across the port 55 of the conduit 57 and the wall 61 will extend across the port 52, thus causing the valve port 62 to connect the conduit 56 with the fan casing. By rotating the valve a distance sufficient to cause the partition 61 to extend from the partition 63 to the wall 48 the port 52 will be connected with the fan casing and the other ports cut off. This movement may be imparted to the valve in any suitable manner, as by means of a handle 64 rigidly secured to one of the heads 59 thereof. To firmly seat the valve a spring washer 65 is preferably provided at that end of the valve opposite the handle 64. In this manner it will be apparent that by the movement of the handle to a selected one of three positions any one of the three devices may be subjected to the action of a current of air.

In order to operatively connect the coffee container 16 with the power shaft 45, the projecting rear end of the shaft 14 is provided with a disk 66, said disk being loose on the shaft. Also fixed upon the projecting end of the shaft 14 in the rear of the disk is a gear 67. Secured to the disk and inclosing the gear is a gear casing 68. A countershaft 69 extends inwardly through a suitable opening formed in the casing and has its front end fixedly connected to the disk. Loosely mounted upon this countershaft is a sleeve 70 and fixedly connected to this sleeve and arranged between the disk 66 and the casing 68 is a pinion 71 which is in mesh at all times with the gear 67. Carried by the sleeve 70 and disposed externally of the casing 68 is a pulley 72 which is driven from a pulley 73 carried by the power shaft 45 through the medium of a belt 74. A nut 75 is secured to the outer end of the countershaft 69 and serves to prevent accidental displacement of the sleeve 70. Extending from one edge of the disk 66 is an ear 76 which is formed in an arcuate slot 77, said slot being concentric with the shaft 14. A set screw 78 extends through the slot 77 and has engagement with the rear wall 6 of the casing. It will thus be observed that when the belt 74 becomes slack it may be easily tightened by revolving the disk 66 toward the right, this movement, of course, being permitted by loosening the screw 78. As the disk is thus shifted the countershaft 69 is likewise shifted by the shaft 14 and as a result the pulley 72 will be moved away from the driving pulley 73. After the belt has been properly adjusted the set screw 78 is also tightened, thereby securing the parts in their adjusted positions, as is clearly shown by the dotted lines in Fig. 2 of the drawings.

In operation coffee is inserted within the container 16 in the manner above described. The container is then rotated from the power shaft 45 through the gearing above mentioned and as a result the agitators 20 within the cylinder 17 coöperate to shift the coffee forwardly toward the outlet door 27. After the coffee has been sufficiently roasted by the heater 30, the latch 28 is raised and the door 27 will swing open by gravity. The coffee will then pass out from the container 16 and drop into the receptacle 33. While the coffee is within the container 16 the valve C is rotated to the position shown by full lines in Fig. 1 of the drawings. In this position of the valve the suction fan 46 will cause the chaff to be withdrawn from the coffee within the container, this chaff passing through the air conduit 21, through the passage 63 of the valve into the compartment 58, thence through the opening 47 into the fan casing and thence out of said casing through the opening 79. After the coffee has been deposited within the receptacle 33 it will be desired to cool said coffee and in order to accomplish this object the valve C is rotated so that the outer partition 60 will close the opening 55 and the passage 62 of said valve will register with the conduits 56 and 58. In this position of the valve cold air will be drawn through the coffee within the receptacle 33 through the conduit 38, thence through the valve and into the fan casing, as will be readily understood.

By means of the nipple 80 any suitable cleaning device (not shown) may be attached thereto and the valve C rotated so as to bring the nipple 80 in direct communication with the fan 46, whereby said cleaning device may be readily actuated.

While I have shown and described one embodiment of my invention it will be understood that this has been chosen for the purposes of illustration only and that I do not desire to be limited to the details of construction shown and described, for obvious modifications will occur to a person skilled in the art.

Having thus fully described my invention, what I claim as new and desire to secure by Letters Patent, is:—

1. In a coffee roaster, the combination, with a plurality of devices for subjecting the coffee to the action of a current of air, a fan having a casing, and three conduits connected with the respective devices, of a single controlling device interposed between said conduits and said fan casing and operable to connect any one of said conduits with said casing and disconnect the other conduits therefrom.

2. In a coffee roaster, the combination, with a plurality of devices for subjecting the coffee to the action of a current of air, a suction apparatus having a casing, and conduits connected with the respective devices, of a single controlling valve interposed between said conduits and said suction apparatus casing and having passageways arranged to connect a selected one of said conduits with said casing and disconnect the other conduits therefrom when said valve is actuated.

3. In a coffee roaster, the combination, with a plurality of devices for subjecting the coffee to the action of a current of air, a fan having a casing, and conduits connected with the respective devices, of a rotary valve interposed between said conduits and said fan casing and constructed and arranged to connect any one of said conduits with said fan casing and to disconnect the other conduits therefrom.

4. In a coffee roaster, the combination, with a plurality of devices for subjecting the coffee to the action of a current of air, a fan having a casing, and conduits connected with the respective devices, of a cylindrical valve casing having ports connected with the respective conduits, and a port leading to said fan casing, a valve rotatably mounted in said casing and having two transverse passages so arranged that when one of said passages is moved into a position to connect said fan casing with one of said ports the other of said ports will be cut off from said fan casing.

5. In a coffee roaster, the combination, with a plurality of devices for subjecting the coffee to the action of a current of air, a fan having a casing, a conduit communicating with said casing and having a plurality of branches leading to the respective devices, and a single valve having passageways to connect said conduit with its branches, said valve being constructed and arranged to connect said conduit with but one of said branches at a time.

6. In a coffee roaster, the combination, with a shaft, a coffee container thereon, and a conduit communicating with said container, of a fan shaft, a fan mounted thereon, a casing inclosing said fan and connected with said conduit whereby the operation of said fan will cause a current of air to pass through said container, a pulley mounted on said roaster near said container shaft, a geared connection between said pulley and said container shaft, a pulley on said fan shaft, a belt connecting said pulleys, and means for adjusting the first-mentioned pulley to regulate the tension on said belt.

7. In a coffee roaster, the combination, with a casing, of a shaft journaled therein, a coffee container fixed on said shaft, a countershaft operatively connected to said shaft and movable about the axis thereof, a drive shaft, a driving connection between said countershaft and drive shaft, and means for locking said countershaft in an adjusted position about the first-mentioned shaft.

8. In a coffee roaster, the combination, with a casing, of a shaft journaled therein, a coffee container fixed on said shaft, a gear fixed on said shaft, a pinion meshing with said gear and movable about the periphery thereof, a drive shaft, a driving connection between said drive shaft and pinion, and means for locking said pinion in its adjusted position about said gear.

9. In a coffee roaster, the combination, with a casing, of a shaft journaled therein, a container fixed on said shaft, a countershaft operatively connected to said shaft and movable about the axis thereof, a drive shaft, a belt connecting the countershaft and drive shaft, and means for locking said countershaft in an adjusted position about the first-mentioned shaft.

10. In a coffee roaster, the combination, with a casing, of a shaft journaled therein, a container fixed on said shaft, a disk axially mounted on said shaft for movements relative thereto, a countershaft carried by said disk and movable about the axis of said shaft, a drive shaft, a belt connecting the countershaft and the drive shaft, and means for locking the disk in an adjusted position.

11. In a coffee roaster, the combination, with a casing, of a shaft journaled therein, a coffee container fixed on said shaft, a disk mounted on said shaft for movements relatively thereto, a gear fixed on said shaft, a casing for the gear secured to said disk, a countershaft carried by said disk, a pinion loose on said countershaft and meshing with said gear, a drive shaft, an operative connection between said pinion and drive shaft, and means for locking the disk in an adjusted position.

In testimony whereof, I affix my signature in presence of two witnesses.

JOSEF C. PRIMS.

Witnesses:
CHAS. J. McINTYRE,
C. C. KNOWLTON.